(12) United States Patent
Heidenbauer

(10) Patent No.: US 9,496,530 B2
(45) Date of Patent: Nov. 15, 2016

(54) ELECTRICAL POWER STORAGE UNIT FOR MOTOR VEHICLES

(75) Inventor: Oliver Heidenbauer, Koeflach (AT)

(73) Assignee: Samsung SDI Co., Ltd., Yongin-si (KR)

( * ) Notice: Subject to any disclaimer, the term of this patent is extended or adjusted under 35 U.S.C. 154(b) by 1066 days.

(21) Appl. No.: 13/201,957

(22) PCT Filed: Feb. 19, 2010

(86) PCT No.: PCT/EP2010/052169
§ 371 (c)(1),
(2), (4) Date: Nov. 1, 2011

(87) PCT Pub. No.: WO2010/094788
PCT Pub. Date: Aug. 26, 2010

(65) Prior Publication Data
US 2012/0040228 A1 Feb. 16, 2012

(30) Foreign Application Priority Data
Feb. 19, 2009 (DE) .................. 10 2009 009 700

(51) Int. Cl.
*H01M 2/02* (2006.01)
*H01M 2/10* (2006.01)
(Continued)

(52) U.S. Cl.
CPC ............ *H01M 2/0242* (2013.01); *H01M 2/02* (2013.01); *H01M 2/1077* (2013.01); *H01M 2/1094* (2013.01); *H01M 2/12* (2013.01); *H01M 10/425* (2013.01); *H01M 10/4207* (2013.01); *H01M 10/613* (2015.04); *H01M 10/625* (2015.04); *H01M 10/647* (2015.04); *H01M 10/6567* (2015.04); *H01M 10/0525* (2013.01); *H01M 10/345* (2013.01)

(58) Field of Classification Search
CPC .......................... H01M 2/02; H01M 2/0242
USPC ..................... 180/68.5; 429/88, 120, 148
See application file for complete search history.

(56) References Cited

U.S. PATENT DOCUMENTS

| | | | |
|---|---|---|---|
| 5,859,580 A * | 1/1999 | Hashizawa | H01R 13/68 337/255 |
| 6,094,927 A | 8/2000 | Anazawa et al. | |
| 6,639,387 B2 | 10/2003 | Kitagawa et al. | |
| 2007/0284167 A1 | 12/2007 | Watanabe et al. | |
| 2008/0050645 A1* | 2/2008 | Kai et al. | 429/61 |

FOREIGN PATENT DOCUMENTS

| | | |
|---|---|---|
| CN | 1394361 A | 1/2003 |
| CN | 200997409 Y | 12/2007 |

(Continued)

OTHER PUBLICATIONS

Chinese Office Action, for Application No. 20108001751806, dated Sep. 4, 2013.

*Primary Examiner* — Basia Ridley
*Assistant Examiner* — James Erwin
(74) *Attorney, Agent, or Firm* — Lewis Roca Rothgerber Christie LLP

(57) ABSTRACT

An electrical power storage unit for motor vehicles, having a housing comprising an electrical battery cell pack in a first housing section and an electrical circuit therefor in a second housing section separated from the first housing section and separately openable, wherein the second housing section has at least one separated and independently openable maintenance region, which—with the exception of an optional contact-protected high-voltage fuse—does not comprise any electrical circuit components operating above a predetermined low-voltage limit, preferably 60 V DC.

10 Claims, 4 Drawing Sheets

(51) Int. Cl.
*H01M 2/12*      (2006.01)
*H01M 10/42*     (2006.01)
*H01M 10/625*    (2014.01)
*H01M 10/647*    (2014.01)
*H01M 10/6567*   (2014.01)
*H01M 10/613*    (2014.01)
H01M 10/0525    (2010.01)
H01M 10/34      (2006.01)

(56) References Cited

FOREIGN PATENT DOCUMENTS

| | | |
|---|---|---|
| EP | 1850407 | 10/2007 |
| EP | 1916727 | 4/2008 |
| JP | 2001037092 A | 2/2001 |

* cited by examiner

ELECTRICAL POWER STORAGE UNIT FOR MOTOR VEHICLES

BACKGROUND OF THE INVENTION

The present invention relates to an electrical power storage unit for motor vehicles, having a housing comprising an electrical battery cell pack in a first housing section and an electrical circuit therefor in a second housing section separated from the first housing section and separately openable.

A power storage unit of this kind is known from US 2007/0284167 A1 and is used in motor vehicles with high electrical power requirement, such as electric vehicles, hybrid vehicles or fuel cell vehicles. In order to obtain quick access to the electric circuit for repair purposes without incurring the risk of electric shock by the high-voltage conducting battery cell pack, the first housing section is provided with an undetachable cover and the second housing section is provided with a screw-off cover. Though this design prevents unintentional contact with the battery cell pack, it does, however, not prevent unintentional contact with individual components of the electrical circuit.

The present invention has the object of creating a power storage unit with improved safety for repair and maintenance work.

SUMMARY OF THE INVENTION

This object is achieved by an electrical power storage unit of the above-mentioned type which according to the invention is characterized in that the second housing section has at least one separated and independently openable maintenance region, which—with the exception of an optional contact-protected high-voltage fuse—does not comprise any electrical circuit components operating above a predetermined low-voltage limit, preferably 60 V DC.

Thus the invention provides a new type of safety concept based on a subdivision of the power storage unit into different safety levels for different repair and maintenance steps ("service levels"): the lowest safety level is the maintenance region where only those assemblies are located which remain below a protective low-voltage limit, so that work thereon can be carried out by service personnel without any special high-voltage training. The medium safety level is formed by the second housing section excluding its maintenance regions and may comprise assemblies which are to be repaired or replaced, but do not remain below a protective low-voltage limit, so that repair and maintenance work is only allowed to be carried out by persons having a corresponding high-voltage training. The highest safety level is represented by the housing section with the battery cell pack which not only carries high voltage, but also comprises components which are only allowed to be manipulated in the factory and in compliance with environment and health protection regulations.

The maintenance covers of the first safety level are appropriately fixed with especially simple fastening means, such as quick-release fasteners or screw connections which can be opened with widely-used tools, whereas for the repair cover of the second safety level fastening means are provided which are more complicated to open, for example, special screws requiring a special opening tool.

According to a preferred embodiment of the invention, at least one of the mentioned maintenance regions comprises at least one fluid circuit component for the battery cell pack. These may be components for supplying the battery cell pack with a liquid or gaseous coolant as well as components for pressure compensation of the battery cell pack.

It is especially advantageous to mount the fluid and electrical circuit components, respectively, in a replaceable manner in the maintenance region(s) in order to simplify their replacement in the lowest safety level.

Another preferred embodiment of the invention is characterized in that the second housing section can be opened by way of at least one repair cover, and that at least one of the mentioned maintenance regions can be opened by way of a separate maintenance cover formed in the repair cover. In this way, separate removal of the maintenance covers can be dispensed with for persons who are entitled and equipped for access to the repair cover of the medium safety level.

It is especially advantageous to support at least one fluid or electrical circuit component at one of the maintenance covers. This further facilitates replacement of the components.

It is advantageous to support the optional high-voltage fuse at one of the maintenance or repair covers, namely in such a way that, during removal thereof, it interrupts high voltage at risk of being contacted in the second housing section. This prevents operation mistakes and further increases safety.

In a further preferred embodiment of the invention, at least one fluid circuit component is a coolant pump, a coolant filter or a coolant sensor for the battery cell pack, which thus renders these assemblies easily accessible for maintenance replacement.

Alternatively, preferably at least one fluid circuit component is a hygroscopic component, for example, granulate for taking up air humidity. Hygroscopic components require regular replacement and are thus especially suitable for arrangement in the lowest safety level.

For the same reasons, it is especially advantageous to embody at least one fluid circuit component as an air filter through which the first housing section is in pressure compensation connection to the outside, in order to aerate and de-aerate the battery cell pack in a filtered manner. Therein preferably the first and the second housing sections are connected through an air channel and the air filter leads, originating from the second housing section, to the outside, enabling especially easy replacement of the air filter.

BRIEF DESCRIPTION OF THE DRAWINGS

Hereinafter the present invention will be explained by way of an exemplary embodiment shown in the accompanying drawings, wherein.

DETAILED DESCRIPTION

Figure 1:
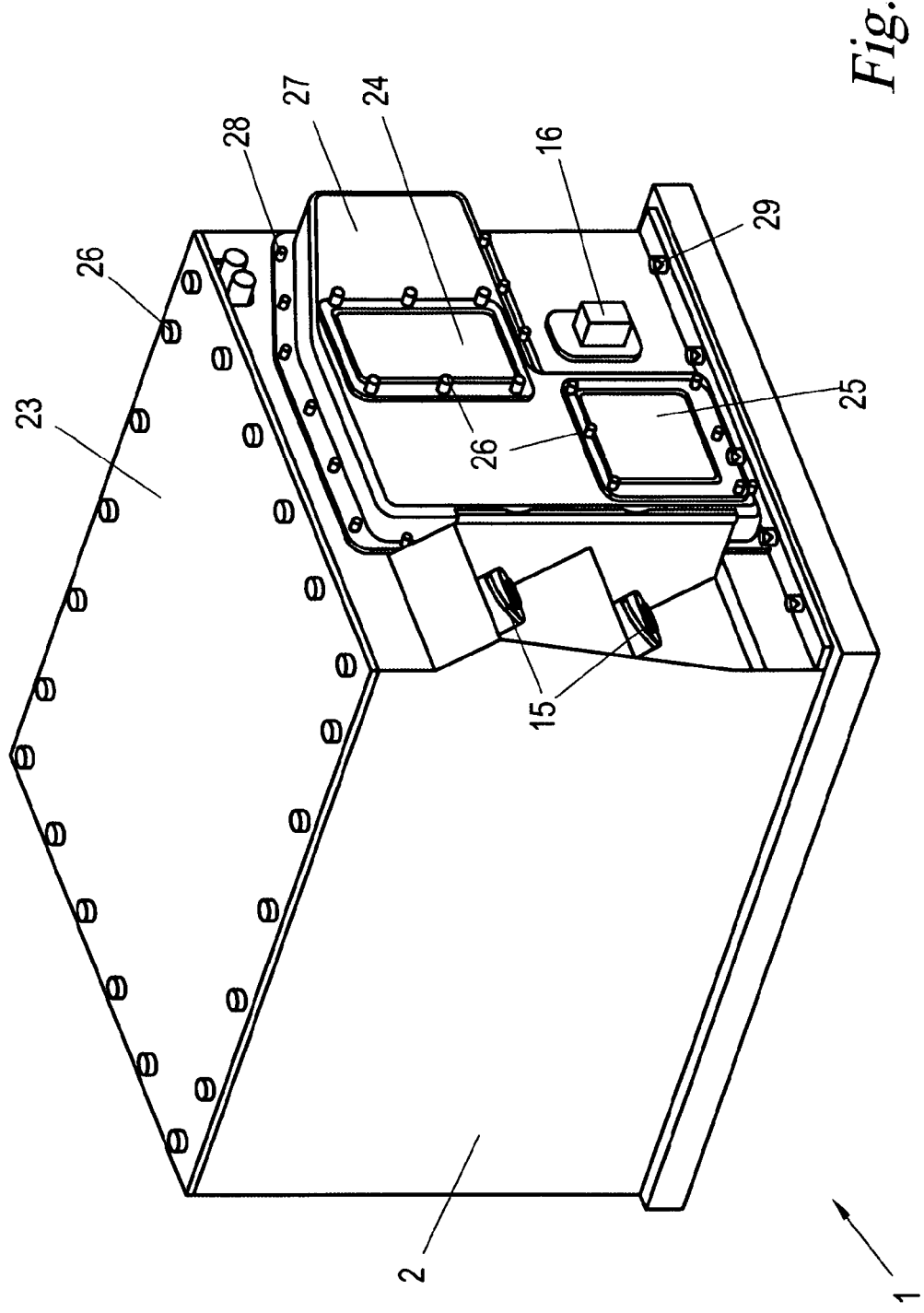
FIG. 1 shows a perspective view of the electrical power storage unit of the invention in a closed state.
Figure 2:
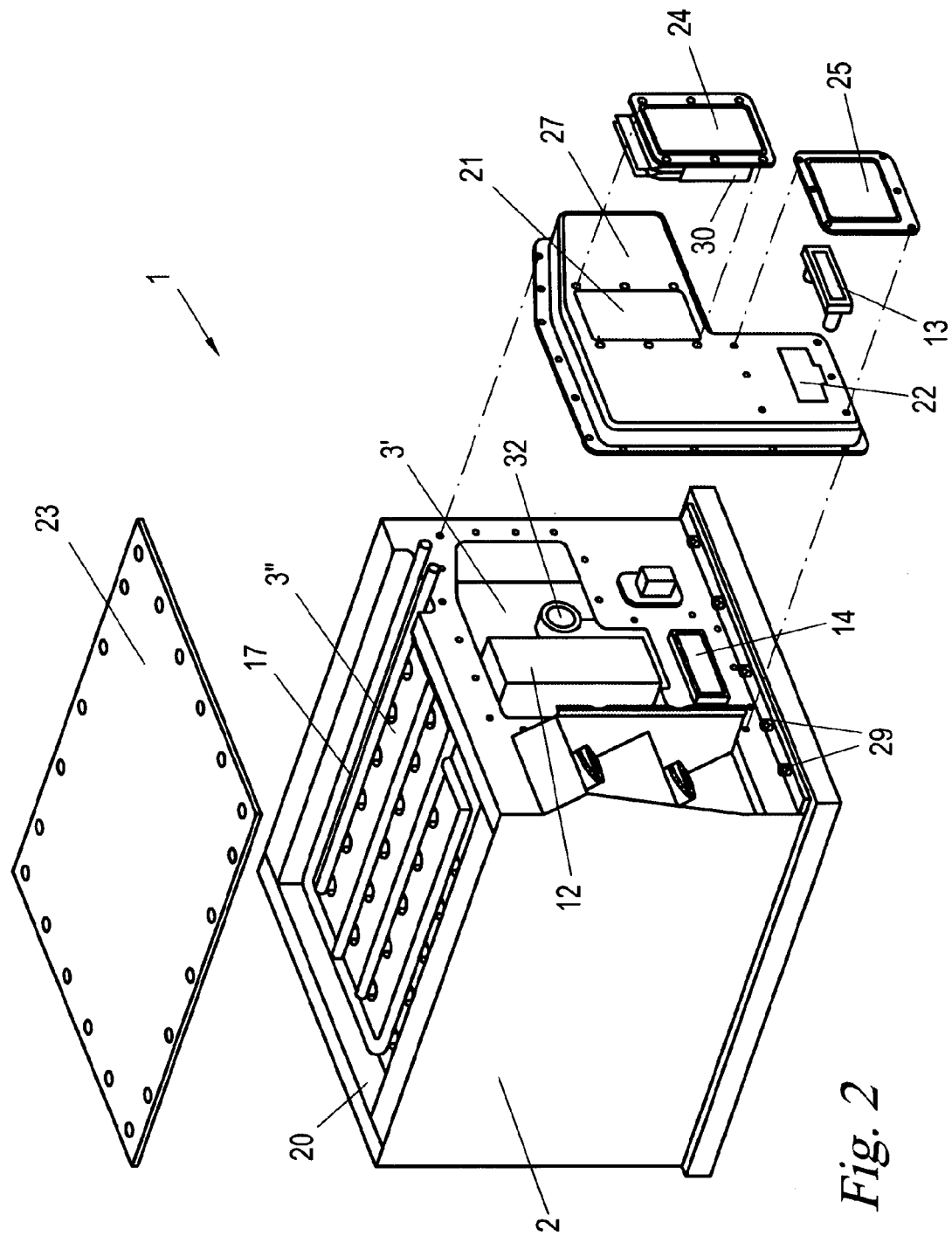
FIG. 2 shows a perspective view of the power storage unit of FIG. 1 with removed maintenance and repair covers.
Figure 3:
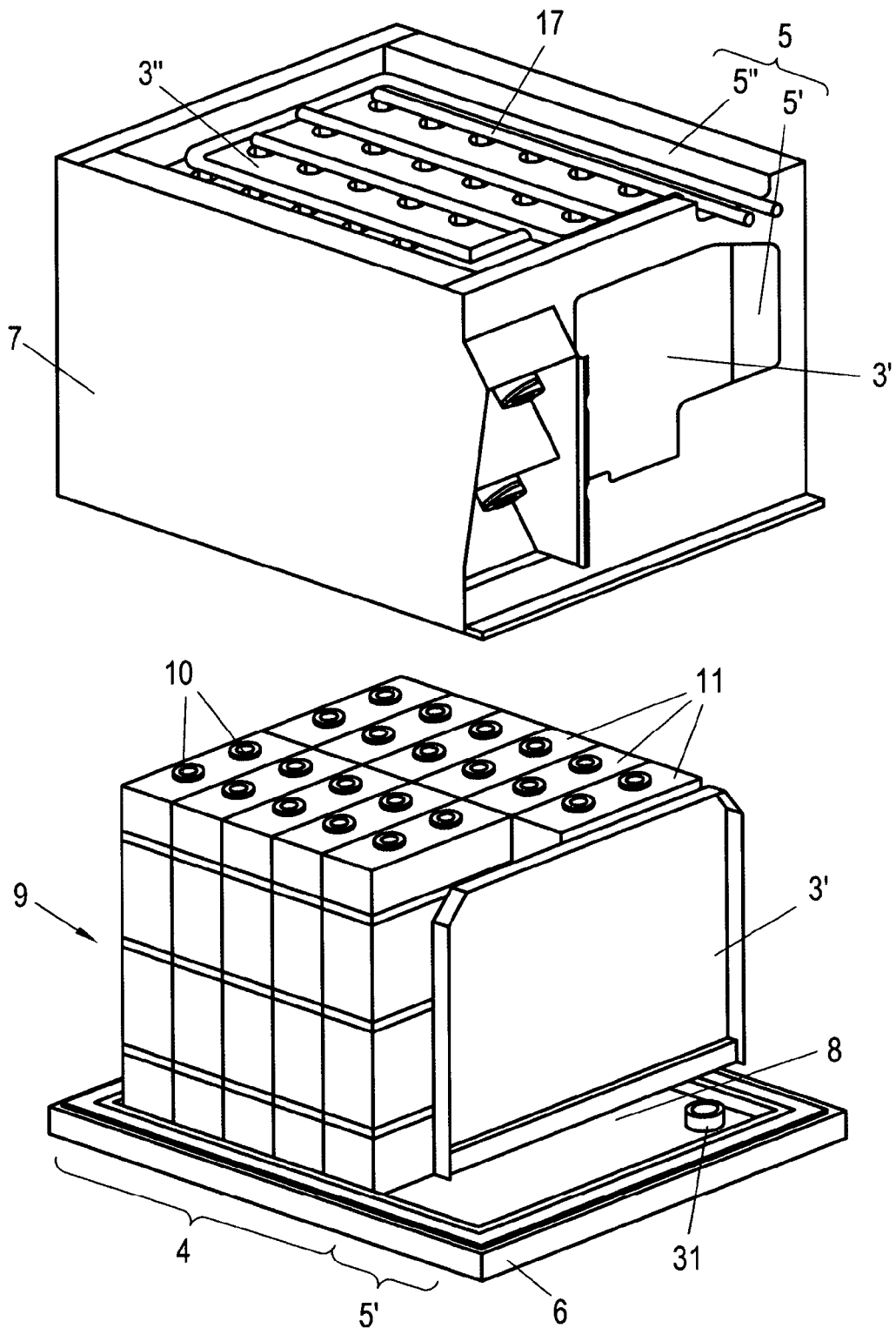
FIG. 3 shows a perspective view of the power storage unit of FIG. 1 after removal of the repair and maintenance covers with disassembled housing.

FIGS. 1 to 3 show an electrical power storage unit 1 having a housing 2. The housing 2 is subdivided by a vertical first partition wall 3' and, angularly adjacent thereto, a horizontal second partition wall 3" into a first housing section 4 and a second housing section 5 surrounding the first housing section 4 at the front side and top side thereof.

The housing 2 comprises a bottom plate 6 and a box-type hood 7 resting thereon, wherein the partition walls 3', 3" are inserted into the box-type hood 7. After assembly of the housing 2, the first partition wall 3' maintains a clearance gap 8 with respect to the bottom 6, establishing a pressure compensation channel between the first housing section 4 and the second housing section 5. The second partition wall 3" extends beyond the first partition wall 3' and thus subdivides the second housing section 5 into a front chamber 5' and a top chamber 5".

The first housing section 4 comprises an electrical battery cell pack 9, for example, in the form of an aggregate of lithium ion or nickel metal hydride cells, which are traversed by coolant ducts 10 and combined to form modules 11.

The second housing section 5 accommodates an electrical circuit as well as a fluid circuit for the battery cell pack 9. The electrical circuit comprises, for example, a high-voltage power circuit unit 12, associated high-voltage wirings, power plug connectors, sensoric wire harnesses and control devices (not shown), as well as a high-voltage fuse 13 in a plug base 14. Withdrawal of the high-voltage fuse 13 causes high-voltage conducting components of the electrical circuit at risk of being contacted to become disconnected from the mains. The high-voltage fuse 13 is designed to be contact-protected, so that there is no risk of electric shock for a user during withdrawal from and insertion into the plug base 14. High-voltage power connections 15 and low-voltage control connections 16 are led out of the housing 2, in order to be able to correspondingly connect the power storage unit 1 to the vehicle.

Exemplary fluid circuit components for the fluid circuit in the second housing section 5 comprise a distribution manifold 17 for supplying and discharging liquid coolant to and from the coolant ducts 10, optional associated coolant pumps, coolant temperature sensors and coolant filters (not shown), as well as an air filter 18 and a hygroscopic component 19 for aerating and de-aerating and air conditioning of the housing sections 4, 5.

In order to establish the mentioned safety levels, the electrical components and fluid circuit components are arranged as follows.

Those components which can be repaired, serviced or replaced without any risk or without any special high-voltage training are arranged in separated independent maintenance regions 20, 21, 22 of the second housing section 5. In the shown example, the maintenance regions 20-22 are distributed onto the chambers 5', 5" of the second housing section 5. The maintenance regions 20-22 are equipped with their own maintenance covers 23-25, which are fixed with easy-to-open fastenings means, such as, for example, conventional screws 26.

In particular, the maintenance regions 20-22—with the exception of the high-voltage fuse 13 which is designed to be contact-protected—do not comprise any electrical circuit components operating above a predetermined low-voltage limit, which preferably is a protective low-voltage limit in the order of 60 V DC. Thereby the maintenance regions 20-22 of the second housing section 5 form a first or lowest safety level which may be opened without any risk and without any high-voltage training, namely by removing the maintenance covers 23-25.

Arrangement of the optional high-voltage fuse 13 in the first safety level has the advantage that the whole power storage unit 1 can be made free of contact voltage already by accessing the first safety level. The high-voltage fuse 13 may be attached directly to the maintenance cover 25, so that it can be removed simultaneously therewith.

Circuit components having an operating voltage above the predetermined low-voltage limit, in the shown example the high-voltage power circuit unit 12 and its peripheral components can be provided in the remaining regions of the second housing section 5 excluding the maintenance regions 20-22. The second housing section 5 excluding the maintenance regions 20-22 thus forms the second medium safety level, which is allowed to be opened only by qualified personnel having undergone high-voltage training, and for this purpose is provided with at least one repair cover 27 closed by special screws 28 requiring a special opening tool.

Preferably some of the maintenance covers 22-25 of the first safety level, herein the maintenance covers 24 and 25, are formed directly in a repair cover 27, so that they can be removed by persons qualified for the second safety level together with the repair cover(s) 27. Furthermore, arrangement of the maintenance covers 24, 25 in the repair cover 27 has the advantage that components of the first safety level may be arranged immediately next to components of the second safety level, for example, by assembling them together on the partition wall 3'.

After the first and the second safety levels have been opened, there remains the first housing section 4 surrounded by the bottom plate 6, the housing hood 7 and the partition walls 3', 3" as the third and highest safety level, which is allowed to be opened exclusively for repair or recycling measures in the factory. In order to gain access to the third safety level, it is, for example, required to remove fastening means located between the housing hood 7 and the housing bottom 6 and not openable in a non-destructive manner, such as rivets 29.

Figure 4:
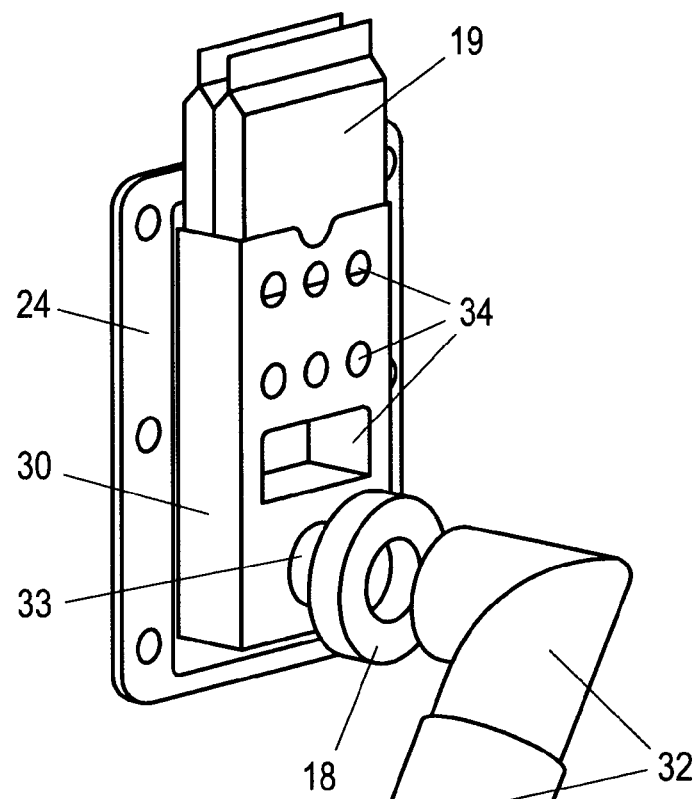
FIG. 4 shows a partial perspective view of the arrangement of the air filter and the hygroscopic component at a maintenance cover.
Figure 4:
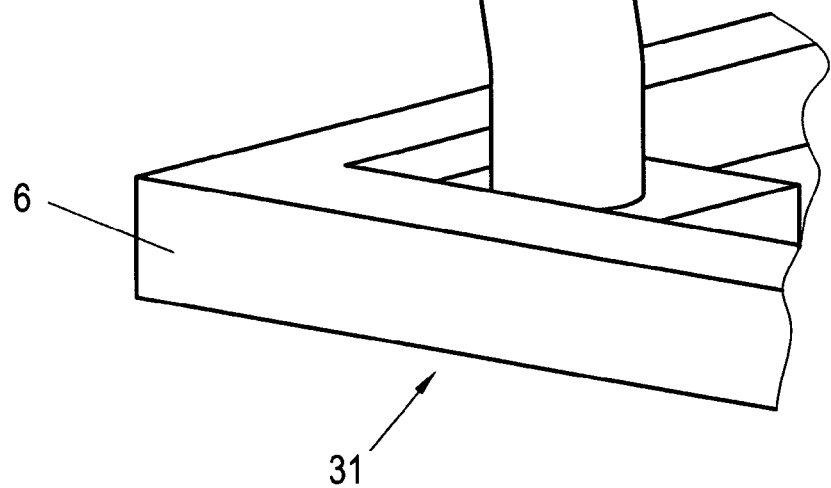

FIG. 4 shows the air filter 18 and the hygroscopic component 19 of the maintenance region 21 in detail. The hygroscopic component 19 is a small bag made of air-permeable material ("drying bag") filled with hygroscopic material, such as silica gel or granulate, and is inserted into a mount 30 of the maintenance cover 24, so that it can be removed together with the maintenance cover 24 from the housing 2.

The air filter 18 is also supported in a replaceable manner at the mount 30 and is connected, on the one hand, to the outside via a tube 32 leading to an opening 31 in the bottom 6 and, on the other hand, via openings 33, 34 in the mount 30 to the second housing section 5 and from there via a clearance gap 8 also to the first housing section 4. Thereby pressure compensation can be realized from the inside of the first as well as the second housing sections 4, 5 via the openings 34, the hygroscopic component 19, the air filter 18, the tube 32 and the opening 31 to the outside.

The invention is not limited to the embodiments shown, but includes all variants and modifications falling within the scope of the attached claims.

The invention claimed is:

1. An electrical power storage unit for motor vehicles, the electrical power storage unit comprising:
   a housing comprising a bottom plate and a plurality of lateral walls, the housing having a first housing section and a second housing section, the first and second housing sections being separately openable, and the second housing section having a first maintenance region and a second maintenance region;
   an electrical battery cell pack in the first housing section;
   an electrical circuit in the second maintenance region and coupled to the electrical battery cell pack, the electrical circuit comprising electrical circuit components; and a removable repair cover coupled to at least one of the lateral walls, the second maintenance region being closed by the repair cover, wherein the first maintenance region, with the exception of a contact-protected high-voltage fuse, does not house any of the electrical circuit components operating above a predetermined low-voltage limit of 60 V DC, and is closed by a removable first maintenance cover mounted to the repair cover, wherein the high-voltage fuse, which is attached directly to the first maintenance cover, is configured to interrupt high-voltage electric current in the second housing section when the first maintenance cover is removed, and wherein none of the electrical circuit components operating above the predetermined low-voltage limit of 60 V DC are accessible through a first opening revealed by the first maintenance cover.

2. The power storage unit according to claim 1, wherein the second maintenance region is independently accessible through a second opening that is closed by a removable second maintenance cover, wherein the second maintenance region houses a fluid circuit component for the battery cell pack and does not house any of the electrical circuit components operating above the predetermined low-voltage limit of 60 V DC, and wherein the fluid circuit component is configured to be replaced through the second opening revealed by the second maintenance cover.

3. The power storage unit according to claim 2, wherein the electrical circuit components are mounted in a replaceable manner in the second maintenance region.

4. The power storage unit according to claim 2, wherein the second maintenance cover is mounted to the repair cover.

5. The power storage unit according to claim 4, wherein the high-voltage fuse and the fluid circuit component are respectively supported at the first and second maintenance covers.

6. The power storage unit according to claim 5, wherein during removal of the first maintenance cover, the high-voltage electric current in the second housing section is interrupted.

7. The power storage unit according to claim 2, wherein the fluid circuit component is one of a coolant pump, a coolant filter or a coolant sensor for the battery cell pack.

8. The power storage unit according to claim 2, wherein the fluid circuit component is a hygroscopic component.

9. The power storage unit according to claim 2, wherein the fluid circuit component is an air filter, through which the first housing section is in pressure compensation connection to outside.

10. The power storage unit according to claim 9, wherein the first and the second housing sections are connected through an air channel and air filter leads, originating from the second housing section, to outside.

* * * * *